SIGERFOOS, SANDO, & FRY.
Gate.
No. 57,782.
Patented Sept. 4, 1866.
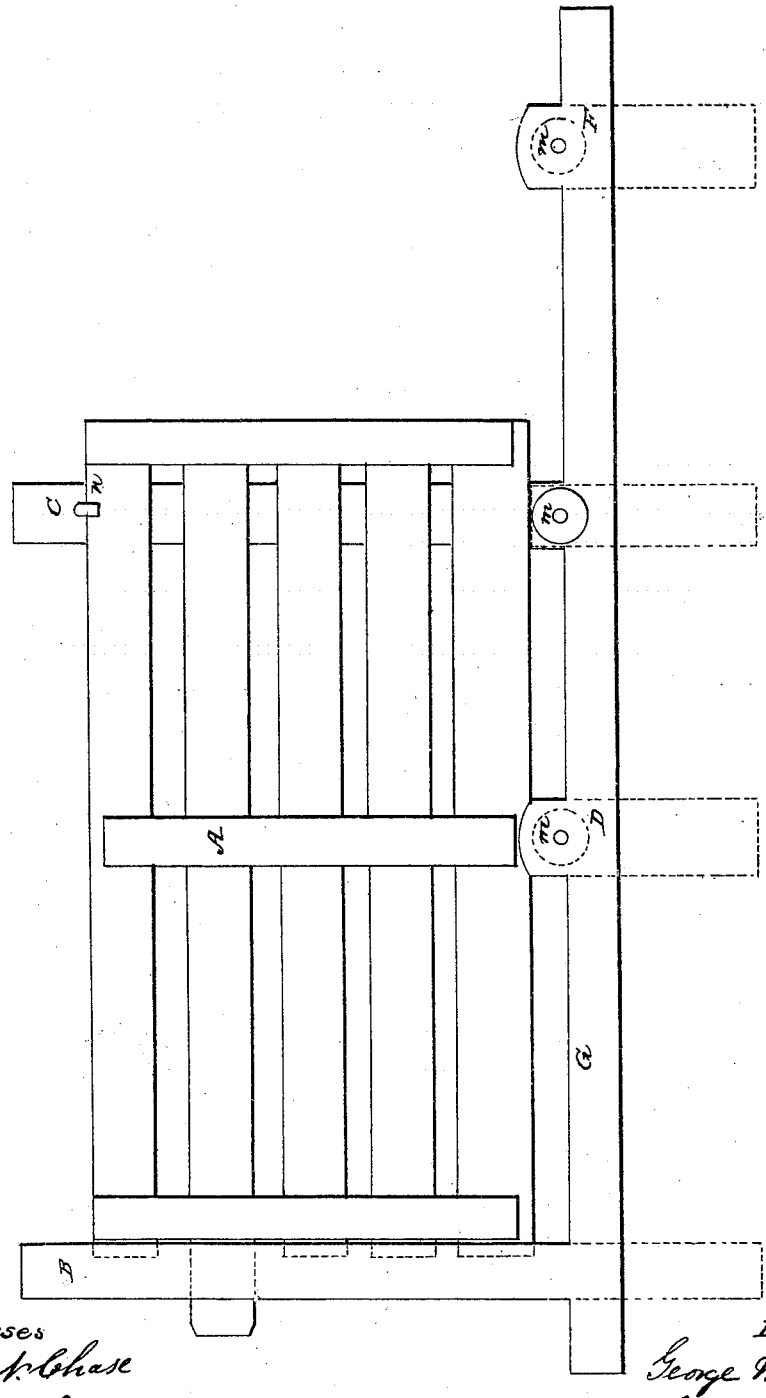

UNITED STATES PATENT OFFICE.

GEORGE W. SIGERFOOS, JOSEPH J. SANDO, AND GEORGE FRY, OF POTSDAM, OHIO.

IMPROVEMENT IN GATES.

Specification forming part of Letters Patent No. 57,782, dated September 4, 1866.

*To all whom it may concern:*

Be it known that we, GEORGE W. SIGERFOOS, JOSEPH J. SANDO, and GEORGE FRY, of Potsdam, in the county of Miami, in the State of Ohio, have invented a new and Improved Gate; and we do hereby declare that the following is a full and exact description thereof, reference being had to the accompanying drawing, and to the letters of reference marked thereon.

The nature of our invention consists in supporting the gate on rollers, on which it moves in opening and closing.

To enable others skilled in the art to make and use our invention, we will proceed to describe its construction and operation.

The figure represents a perspective view of the gate.

A represents the gate, which is constructed in a manner very similar to gates in general use. The post B is grooved for the purpose of receiving the ends of the boards of the gate, the next to the upper one being of sufficient length to pass through a mortise of the post, and in which a pin is used to hold the gate shut. Near the top of the post C is a stay-piece, n, to hold the gate in position, and at a point near the ground a roller, m, is attached, which, with two other rollers, supports the gate. The posts B C and the posts D F, which support the rollers m m, are put into the ground, as indicated by the dotted lines, instead of being attached to the sill G.

The rollers may be constructed with flanged edges or with a plain surface, the gate then being stayed in position by the gate passing within the groove formed for the rollers in the posts D and F.

What we claim as our invention, and desire to secure by Letters Patent, is—

The combination of the posts B C D F, rollers m, stay-piece n, and gate A, substantially as described, and for the purposes set forth.

GEORGE W. SIGERFOOS.
JOSEPH J. SANDO.
GEORGE FRY.

Witnesses:
DANIEL M. CHASE,
JOSEPH W. MENDENHALL.